United States Patent [19]

Guilbert et al.

[11] Patent Number: 4,621,122

[45] Date of Patent: Nov. 4, 1986

[54] HIGH-TEMPERATURE RESISTANT ELECTRICALLY INSULATING COATING POWDER

[75] Inventors: Curtis R. Guilbert, St. Paul, Minn.; Peter Fialla, Wiener Neudorf, Austria

[73] Assignee: Minnesota Mining and Manufacturing Company, St. Paul, Minn.

[21] Appl. No.: 708,701

[22] Filed: Mar. 6, 1985

Related U.S. Application Data

[63] Continuation-in-part of Ser. No. 617,324, Jun. 5, 1984, abandoned.

[51] Int. Cl.$^4$ .................. C08L 63/00; C08L 79/08
[52] U.S. Cl. .................. 525/422; 428/418; 428/457; 428/458; 525/438; 528/98; 528/100; 528/112; 528/170; 528/322
[58] Field of Search .................. 525/422, 438; 528/98, 528/100, 112, 170, 322; 428/418, 457, 458

[56] References Cited

U.S. PATENT DOCUMENTS

| | | | |
|---|---|---|---|
| 4,212,959 | 7/1980 | Fukami et al. | 525/422 |
| 4,237,262 | 12/1980 | Jones | 525/422 |
| 4,267,300 | 3/1981 | Guilbert | 528/92 |
| 4,273,916 | 6/1981 | Jones | 525/422 |
| 4,283,521 | 8/1981 | Jones | 525/422 |
| 4,346,206 | 8/1982 | Takahashi et al. | 525/422 |
| 4,401,777 | 8/1983 | Tsuboi et al. | 525/422 |

*Primary Examiner*—Lester L. Lee
*Attorney, Agent, or Firm*—Donald M. Sell; James A. Smith; Roger R. Tamte

[57] ABSTRACT

Electrically insulating wire coatings are resistant to prolonged exposure to 200° C. when formed from a powder which, in a preferred composition, is a blend of
 (a) epoxy-terminated adduct of hydantoin diepoxide and aromatic dicarboxylic acid imide dissolved in hydantoin diepoxide,
 (b) acid-terminated polyester of aromatic dicarboxylic acid and diphenol containing one aromatic ring pendant from a central carbon atom,
 (c) bismaleimide, and
 (d) fumaric acid.

31 Claims, No Drawings

HIGH-TEMPERATURE RESISTANT ELECTRICALLY INSULATING COATING POWDER

REFERENCE TO RELATED APPLICATION

This application is a continuation-in-part of application Ser. No. 617,324, filed June 5, 1984 and now abandoned.

TECHNICAL FIELD

The invention concerns powder useful for applying electrically insulating coatings and, more specifically, powder that is to be applied by fluidized bed and dry-spraying procedures to form thermosetting resinous coatings.

BACKGROUND ART

Fluidized bed and dry-spraying procedures have long been used to apply powders to form thermosetting resinous coatings on metal pipes, panels, reinforcing bars, transformer cases, and the like. Most such coatings are far too hard and brittle to provide electrically insulating coatings on wires, because they tend to crack when subjected to severe stress, either upon being bent or upon expanding and contracting with changes in temperature. The stress can be especially severe when the wire has the rectangular cross-section which is usually specified for windings of the largest wire gauges. The coatings must be resistant to abrasion at the high speeds at which the wires may be wound and to chemicals such as hot transformer oils and automotive fluids to which starter motor windings may be exposed.

It is believed that the first powder to form truly satisfactory electrically insulating coatings on wires is disclosed in U.S. Pat. No. 4,267,300 (Guilbert). That powder comprises a blend of (a) polyglycidyl ether of bisphenol A capped with monobasic aromatic acid and (b) trimellitic anhydride. However, coatings formed of that powder would deteriorate if subjected to prolonged exposure to temperatures much above 140° C. Also, that powder cannot be fused and cured at temperatures significantly higher than 370° C. Higher curing temperatures would allow faster production rates.

The trimellitic anhydride used in the Guilbert patent involves several problems:
(1) toxicity,
(2) high melting point (above 250° C.) and the difficulty of dispersing it homogeneously in the polyglycidyl ether,
(3) moisture pickup, and
(4) marginal shelf life.

DISCLOSURE OF INVENTION

The invention concerns a powder which forms electrically insulating wire coatings that are generally equivalent to those of the aforementioned Guilbert patent in every respect except that (1) coatings formed of the novel powder withstand prolonged exposure to 200° C. and (2) the coatings can be cured much faster because they can be cured at substantially higher temperatures. Furthermore, the above-listed problems resulting from the use of trimellitic anhydride are avoided.

The extraordinary resistance to high temperatures of coatings formed of the novel powder is achieved through the use of highly aromatic materials, but it is remarkable to be able to form a thermosetting blend of such highly aromatic materials without initiating cure of those materials. Briefly, the novel powder comprises a blend of (a) epoxy-terminated compound based on hydantoin diepoxide, and (b) acid-terminated polyester of aromatic dicarboxylic acid and diphenol containing one aromatic ring pendant from a central carbon atom. Preferably the composition also includes (c) ethylenically unsaturated aromatic fluxing agent, and (d) an unsaturated short-chain dicarboxylic acid. The whole blend should include from 0.9 to 1.4 (preferably from 1.0 to 1.3) epoxy equivalents of ingredient, (a) per acid equivalent of ingredients (b) plus (d), and from 1.0 to 1.6 unsaturated equivalents of ingredient (c) per unsaturated equivalent of ingredient (d).

The ingredient (a) epoxy-terminated compound preferably is an adduct of hydantoin diepoxide and aromatic dicarboxylic acid imide dissolved in hydantoin diepoxide. Preferred as the aromatic dicarboxylic acid imide for making the ingredient (a) solution is a eutectic mixture of 80 parts by weight of the compound shown as "Formula I" and 20 parts by weight of the compound shown as "Formula II".

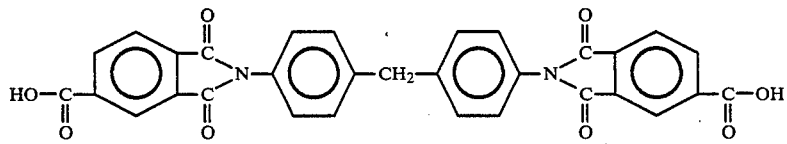

Formula I

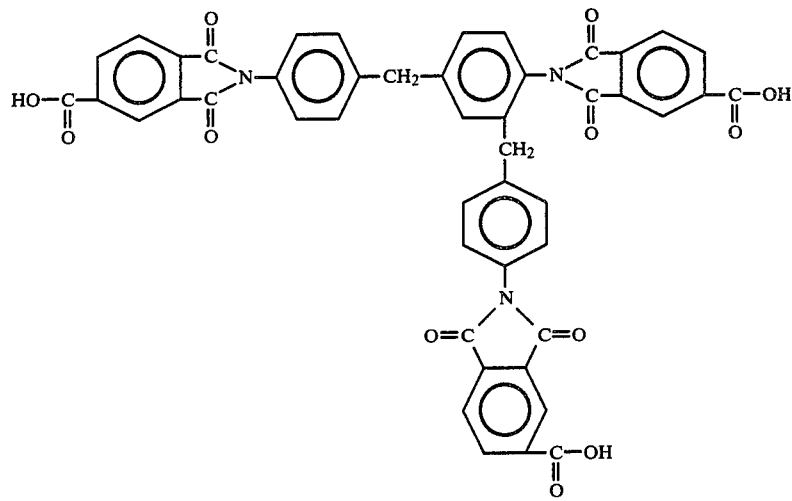

Formula II

Such mixture is more soluble in and reacts faster with a hydantoin diepoxide than does the Formula I acid imide by itself, and the combined adducts of those two acid imides and a hydantoin diepoxide have surprisingly low melting points, considering their highly aromatic nature.

The ingredient (a) solution may be made by stepwise addition to a heated hydantoin diepoxide of aromatic dicarboxylic acid imide while keeping the temperature at 120° C. or less to avoid gellation. The acid imide addition should be discontinued before the melt becomes too viscous to be stirred at 120° C. When the reaction is complete, the weight ratio of adduct to unreacted diepoxide may extend from about 2:1 to 3:1.

Within that range, the melting point of solution (a) should be between 70° and 130° C. Lower melting points result when that ratio is below 2:1, but if the melting point of solution (a) were below about 70° C., it would be necessary to refrigerate the novel powder to avoid blocking during storage. Because a hydantoin diepoxide is a powerful solvent both for the ingredient (c) and for the adduct of ingredient (a), it preferably is used in the maximum amount that will allow the melting point of solution (a) to be from 100° to 110° C.

When made with the aforementioned preferred eutectic mixture of acid imides, the adduct of solution (a) is a mixture of two oligomeric forms, one having

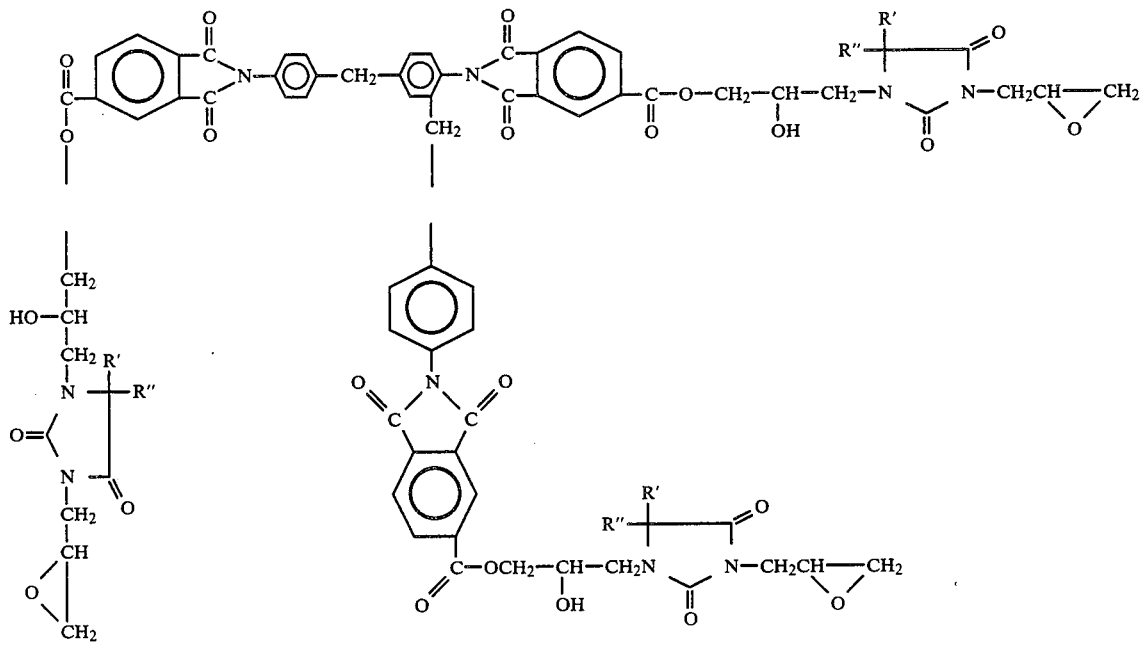

Formula III and the other having

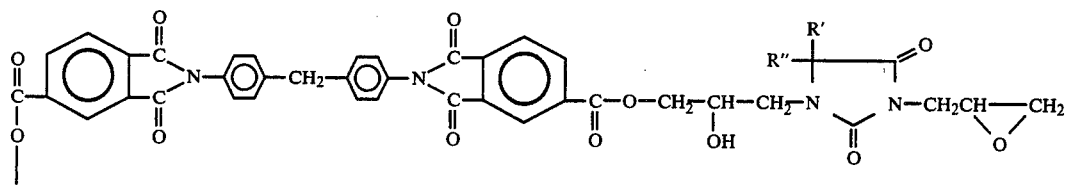

Formula IV

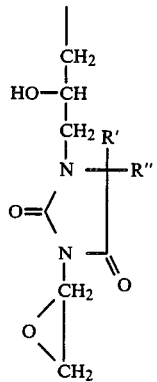

wherein each R' and R" is hydrogen or lower alkyl and at least one of R' and R" is lower alkyl. The mixture of those two oligomeric forms is believed to be novel by itself.

A commercially available hydantoin diepoxide (XU-238, Ciba-Geigy Corp.) which is especially useful for making the adduct of solution (a) is

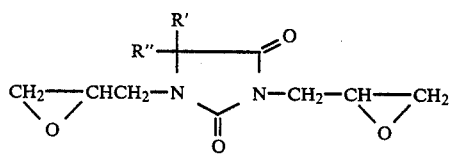

Formula V

Polyester (b) should have a molecular weight low enough so that it may be melted and blended with the other ingredients. On the other hand, some chain extension is generally desirable for flexibility. Preferably, the number average molecular weight of polyester is between about 2000 and 4000. Preferably also the number average molecular weight is measured by gel permeation chromotography, because this would reveal any substantial amount of unreacted diphenol.

A preferred diphenol for making polyester (b) is

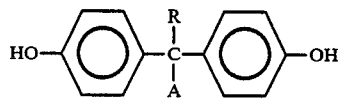

Formula VI wherein R is a lower alkyl group and A is a phenyl group. Minor substituents can be included, e.g., methyl groups or unsaturated side chains pendant from the phenol groups. As may be seen, the phenyl group is pendant from a central carbon atom, or as can be stated another way, from a methylene bridge across the phenol groups. An especially economical diphenol is 1,1-bis(4-hydroxyphenyl)-1-phenylethane which is sometimes called "Bisphenol C".

Preferably the aromatic dicarboxylic acid used for making polyester (b) is a eutectic mixture of dicarboxylic acid chlorides, especially isophthaloyl chloride and terephthaloyl chloride in a ratio from 1:4 to 4:1; most preferably the acid chlorides are present in approximately equal parts. The mixture of chlorides results in a polyester of desirably low melting point within a preferred range of average molecular weights, which is useful in making a finished powder of desirably low melting point, e.g., 100° to 110° C. A preferred polyester (b) is an eutectic copolymer shown as

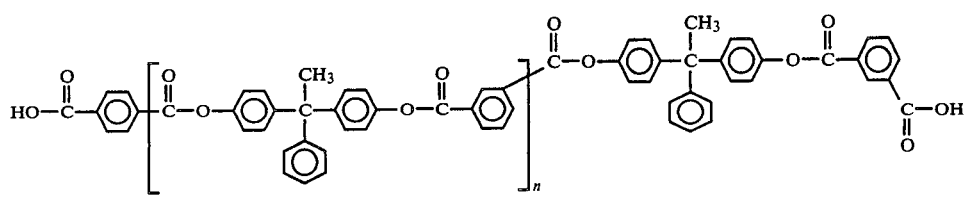

Formula VII where n is from 1 to 10, preferably from 3 to 5. At less than 1, the novel powder might not withstand 200° C. for prolonged periods of time, whereas above about 10, the melting point of polyester (b) might be too high for convenient blending with other ingredients of the novel powder without danger of initiating premature curing.

Polyesters of Formula VII may be made by variations of the general process taught in U.S. Pat. No. 4,388,454. This process may be generally characterized as an interfacial polymerization process in which a fine dispersion is prepared from (a) an aqueous phase consisting of bisphenol, alkali hydroxide in stoichiometric ratio or in slight excess to form a bisphenolate, and a phase transfer catalyst such as bensyltriethylammonium chloride, tetrabutylammonium iodide or crown ether dissolved in water or, if applicable, in a mixture of water and an organic solvent as solubilizer and (b) an organic liquid phase consisting of a solution of the acid halide in an organic solvent. The bisphenolate, transferred into the organic-liquid phase by means of the phase transfer catalyst, enters into a polycondensation reaction with the acid halide, whereupon polyester is obtained from the organic-liquid phase. The variation is generally characterized in that, from the beginning of the polycondensation, the dispersion contains an undersupply of the bisphenolate contained in the aqueous phase—in relation to the acid halide contained in the organic phase for the longest part of the reaction cycle.

According to an advantageous embodiment of this variation in method, a phase transfer catalyst is contained not only in the aqueous phase, but also in the organic-liquid phase used.

In a further advantageous variation, the aqueous phase, which contains the bisphenol to be used in stoichiometric ratio or in an undersupply in relation to the acid halide used in the organic-liquid phase, is added to the organic-liquid phase prepared in a vessel continuously or successively in portions under constant, intensive agitation, whereafter, if applicable, the dispersions of aqueous and organic-liquid phase are kept up by continued agitation at least to the conclusion of the polycondensation. The aqueous phase is added so slowly—advantageously over a period of 1 to 15 minutes—that the specified quantities of aqueous phase are immediately dispersed in the organic-liquid phase.

The inherent viscosity of the prepared polyester can be influenced by varying the temperature, the rate at which the aqueous phase is added, the concentration of the solubilizer and/or the phase transfer catalyst and, if applicable, by using a phase transfer catalyst additionally also in the organic liquid phase.

The polyester generally has an inherent viscosity of 0.08 to 0.35 dl/g, preferably 0.1 to 0.25 dl/g (measured at 30° C. in a 100 ml solution of 0.5 g of the polyester in a solvent consisting of 60 weight percent phenol and 40 weight percent 1,1,2,2-tetrachloroethane).

The aromatic fluxing agent (c) preferably includes imide linkages which tend to be more resistant to high temperatures than are other linkages. A preferred aromatic imide fluxing agent is a bismaleimide, which is commercially available as "Bismaleimide-M" from Mitsui Toatsu, Inc., having

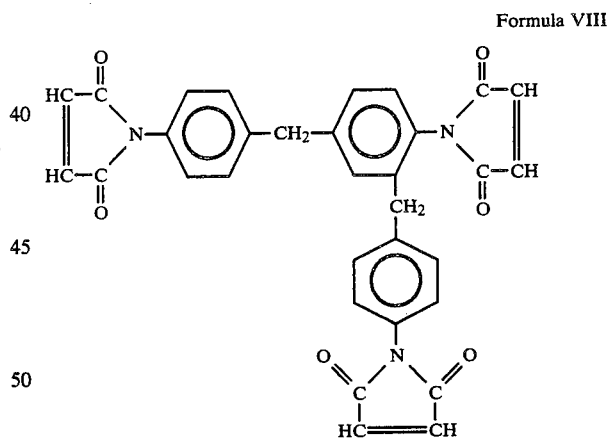

Formula VIII

Because it is soluble in each of ingredients (a) and (b), a bismaleimide helps to reduce the viscosity and hence the processability of the blend used in making the novel powder.

A preferred unsaturated short-chain dicarboxylic acid (d) is fumaric acid, because its high melting point (286° C.) makes it substantially unreactive with the other ingredients at blending temperatures. Also useful is itaconic acid (MP 175° C.), but its heat resistance is not as good as that of fumaric acid. Maleic acid (MP 131° C.) can be used, although its reactivity at blending temperatures creates a hazard of premature gellation.

In addition to the above-discussed ingredients (a) through (d), the novel powder preferably also contains a flow control agent to provide smooth coatings, as is well-known in the art. Of known flow control agents, the fluorocarbons have the best heat resistance. Furthermore, their extraordinarily high efficiency makes them effective in such minute quantities that even if they, by themselves, have inferior heat resistance, the coatings should nevertheless withstand prolonged exposure to 200° C.

To optimize physical properties of the cured coating (e.g., flexibility, adhesion and cohesion, dielectric properties, heat resistance), all of ingredients (a) through (d) should chemically interact completely during curing. Theoretically this calls for exact stoichiometry. However, the tendency of epoxy groups to interact chemically with other epoxy groups makes it desirable for the blend to include a slight stoichiometric excess of the ingredient (a) solution, preferably about 1.1 epoxy equivalents per acid equivalent of ingredients (b) plus (d). A wide range of ratios of ingredient (a) to ingredient (b) can be used, e.g., from a ratio of about 5:1 to a ratio of about 1:9. However, best results are obtained with a ratio of about 1:3. There also preferably is a stoichiometric excess of unsaturated equivalents of the aromatic fluxing agent (c), preferably about 1.2 per equivalent of the dicarboxylic acid (d), because it more readily reacts with itself than does the dicarboxylic acid (d). Furthermore, when using as the fluxing agent (c) a bismaleimide which has three unsaturated groups, at least one group in every molecule is almost certain to interact chemically into the thermoset network of any cured coating.

The ingredients of the novel powder may be blended together in a twin-screw extruder or on a rubber mill. The former is preferred because it allows higher production rates. In either case, the processing temperature is significant lower than the temperature at which appreciable curing of the blend would be initiated, so that the softened ingredients can be thoroughly blended before being cooled and ground into a powder, with assurance that substantially every particle of the powder becomes uniformly cured. Because coatings of the novel powder can be fused and cured at extraordinarily high temperatures, e.g., 430°–480° C., curing is completed within about 5 or 6 seconds, thus allowing very high production rates. Even higher fusing and curing temperatures, such as 500° C., should be feasible, enabling even shorter curing times. In spite of having such a fast cure, preferred powder of the invention can be stored many months at ordinary room temperatures without any danger of becoming prematurely cured. When kept below 20° C., preferred powder of the invention should remain free-flowing after prolonged bulk storage in economically large quantities such as 20 kg, and it is improved in this respect compared to some coating powders now on the market.

As compared to the wire coating powder of the above-discussed Guilbert patent, preferred powder of the invention is believed (1) to form smoother, more uniform coatings, (2) to be less susceptible to moisture pickup, and (3) to be less likely to involve toxicological problems.

The powder of this invention is useful to form electrically insulating, protective, or other coatings on other articles besides electrically conducting wire. Also, the novel powder can be electrostatically applied to a low-adhesion carrier web and fused into a self-sustaining film which can be peeled off and used as an electrically insulating barrier. An adhesive may be applied to the self-sustaining film, either before or after removing it from the carrier web, thus providing an electrically insulating tape.

Epoxy-terminated Adduct Solution A

A 2-liter resin flask was charged with 812 gm of a hydantoin diepoxide (Formula V above) and heated to 100° C. To this, a eutectic mixture of 80 parts by weight of the acid imide of Formula I and 20 parts of that of Formula II was added in 20-gm portions over a 10-minute period to a total weight of 300 gm. The temperature of the reaction mixture was maintained at 120° C. for 30 minutes after addition of the acid imide mixture was completed. The resulting solution (called "Epoxy-terminated Adduct Solution A" or simply "Solution A") was then dumped into a Teflon-lined container and allowed to cool. Solution A was a light red solid having a melting point (mid-range) of about 100° C. and an epoxy equivalent weight of 410. Analyses showed Solution A to be 80 parts of the adduct of Formula III and about 20 parts by weight of the adduct of Formula IV dissolved in Formula V and that Formula V comprised about 30% by weight of Solution A.

Exemplary Preparation of Formula VII

To produce the aqueous phase, first 8.8 g (0.22 mol) NaOH and then 29 g (0.1 mol) of 1,1-bis(4-hydroxyphenyl)-1-phenylethane (Bisphenol C) are dissolved in 400 ml of heated water, cooled, and the cooled solution mixed with 70 ml of isopropanol. To this solution are then added as a phase transfer catalyst 1.14 g (0.005 mol) benzyltriethylammonium chloride dissolved in a little water.

The organic liquid phase, consisting of a solution of 13.2 g (0.065 mol) of isophthaloyl chloride and 13.2 g (0.065 mol) of terephthaloyl chloride in 250 ml anhydrous dichloroethane, is prepared in a nitrogen atmosphere in a 2.5-liter retort equipped with a high-speed agitator, e.g., a dispergator, and cooled to 17° C. in a cooling bath.

The agitator is turned on, and the aqueous phase is metered into the prepared organic liquid phase over a period of 6 min. The intensity of agitation causes the aqueous phase to be dispersed immediately in the organic liquid phase. During this addition of the aqueous phase, the temperature in the dispersion rises from 17° C. to about 26° C. Agitation is continued for another 6 min after the aqueous phase has been added to maintain the dispersion during a postreaction time period.

Upon turning off the agitator, the phases will soon separate by settling, the weakly alkaline aqueous phase being discarded. The organic-liquid phase containing the low-molecular polyester form is then rinsed three times with water and the polyester finally precipitated in fine-grained form by adding isopropanol and agitating. The precipitated material is filtered by suction and dried in the vacuum drying oven at 80° C. 40 g of a polyester (which is a 95% yield) of an inherent viscosity of 0.13 dl/g and a melting range between 200° C. and 220° C. are obtained.

The inherent viscosity (IV=$\eta_{inh}$) is measured at 30° C. on 100 ml solution of 0.5 g polyester in a solvent consisting of 60 weight % phenol and 40 weight %, 1,1,2,2-tetrachloroethane.

| Exemplary Preparation of Product of the Invention | |
|---|---|
| Ingredients | Grams |
| Epoxy-terminated Adduct Solution A | 10 |
| Polyester of Formula VII (equivalent weight 1200; number average molecular weight 2560) | 30 |
| Bismaleimide (Formula VIII) | 10 |
| Fumaric acid | 1 |
| Fluorocarbon flow control agent | 0.004 |
| Fumed silica having hydrophobic surface treatment | 0.08 |

The Solution A, the polyester, the bismaleimide, and the fumaric acid were individually pulverized and then dry blended together and melt mixed, together with the flow control agent, on a rubber mill for five minutes (bottom roll temperature 60° C.). After cooling, the solid melt was ground to a fine powder in a hammer mill. The powder was next blended with the silica and put through a 140-mesh screen (105-micrometer openings). Of the powder which passed:
 4% retained on 200 mesh (74-micrometer openings),
 19% retained on 325 mesh (44-micrometer openings),
 34% retained on 400 mesh (37-micrometer openings),
and gel time at 204° C. was 25 seconds.

Using an electrostatic fluidized bed, the powder was coated onto several clean aluminum Q panels. The coated panels were heated in an oven at 230° C. for 10 minutes to fuse and convert the powder into smooth, cured coatings, each having a thickness of about 75 micrometers. The coatings were tested with the following results:
 Dielectric breakdown: 1100 volts/25 micrometers
 Dissipation factor: 11% at 150° C.

Some coated panels were bent 180° over a ¼-inch (0.625 cm) mandrel and then placed in a 175° C. oven for ½ hour. This produced no visible cracks in the coatings.

Other panels were placed in an oven, the temperature of which was increased 10° C. per minute to 350° C. This produced a weight loss of 5%.

Other panels were left in an oven at 200° C. for 5 months with no loss of continuity and only a slight darkening of the coatings. This indicated 200° C. thermal oxidative stability.

We claim:
1. Powder useful for application to a heated substrate where it softens, flows together, and reacts to form a continuous infusible electrically insulating coating, comprising a blend of
 (a) epoxy-terminated adduct of hydantoin diepoxide and aromatic dicarboxylic acid imide, and
 (b) acid-terminated polyester of aromatic dicarboxylic acid and diphenol containing one aromatic ring pendant from a central carbon atom.

2. Powder of claim 1 which further includes an ethylenically unsaturated aromatic fluxing agent.

3. Powder of claim 1 which further includes an unsaturated short-chain dicarboxylic acid.

4. Powder as defined in claim 1 wherein the adduct of hydantoin diepoxide and aromatic dicarboxylic acid imide is dissolved in hydantoin diepoxide to provide a solution having a melting point between 70° and 130°.

5. Powder as defined in claim 4 wherein said aromatic dicarboxylic acid imide is a eutectic mixture of

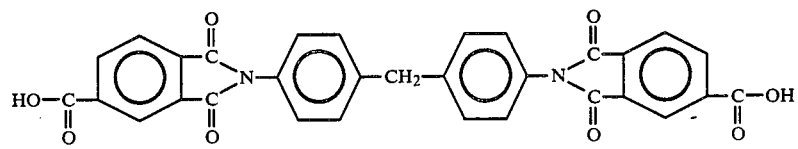

and

-continued
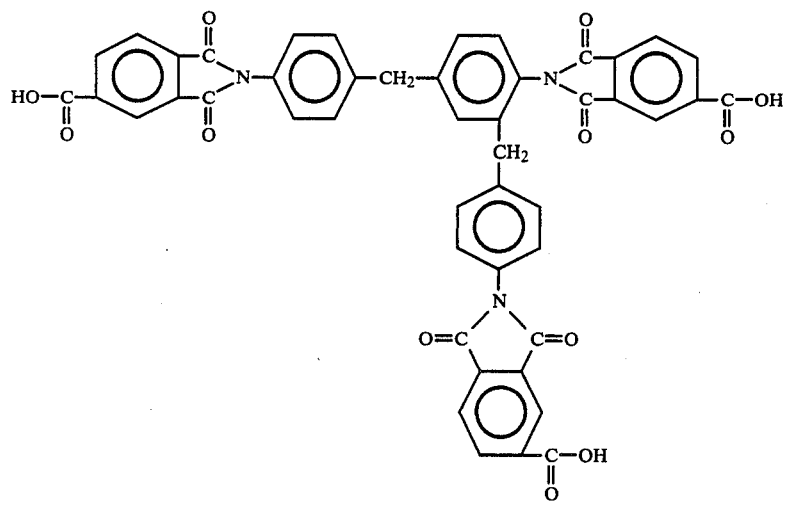
6. Powder as defined in claim 1 wherein said blend includes from 1.0 to 1.3 epoxy equivalents of compound (a) per acid equivalent of other ingredients.
7. Powder as defined in claim 1 wherein compound (a) comprises a mixture of
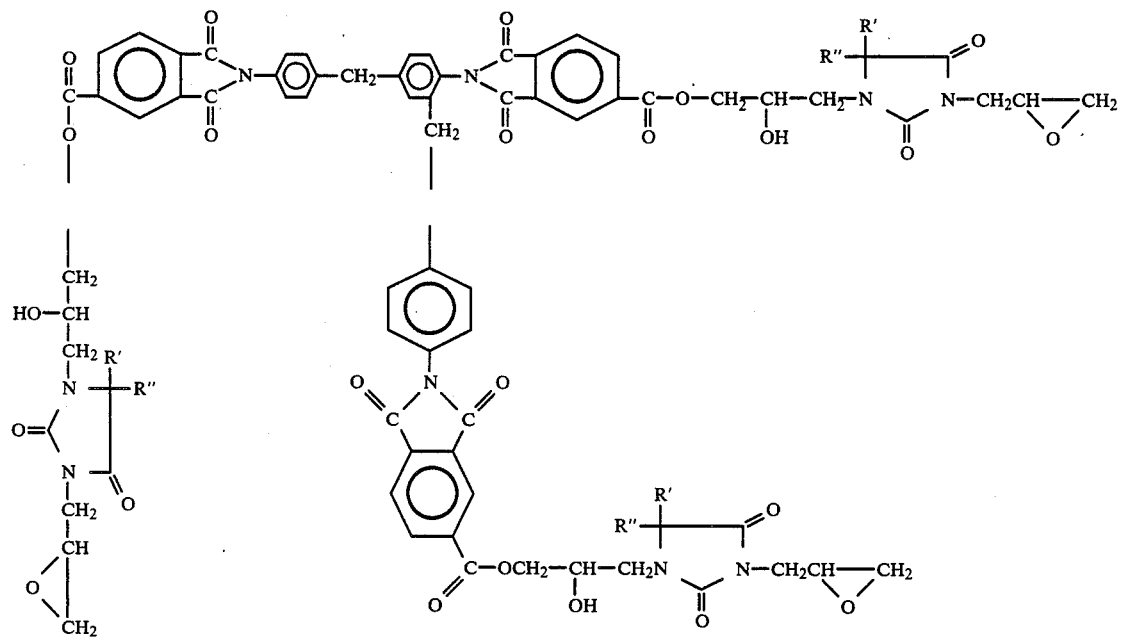
and
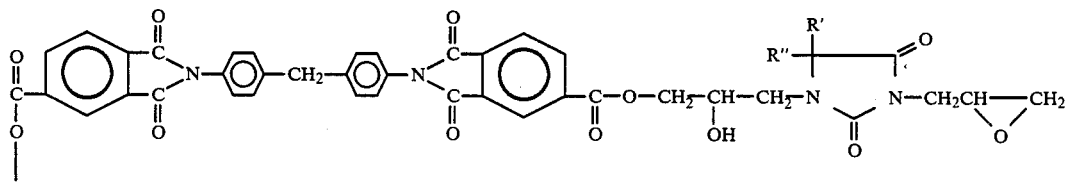

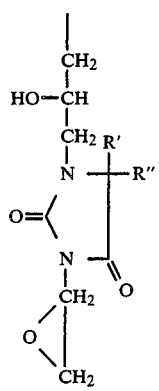

8. Powder as defined in claim 1 wherein said diphenol has the formula

wherein R is a lower alkyl group and A is a phenyl group.

9. Powder as defined in claim 8 wherein R is methyl and A is unsubstituted.

10. Powder as defined in claim 2 wherein the fluxing agent is a bismaleimide.

11. Powder as defined in claim 10 wherein the bismaleimide is trifunctional.

12. Powder as defined in claim 3 including a trifunctional bismaleimide fluxing agent in an amount of approximately 1.2 unsaturated equivalents of the fluxing agent per unsaturated equivalent of the short-chain dicarboxylic acid.

13. Powder as defined in claim 12 wherein the fluxing agent has the formula

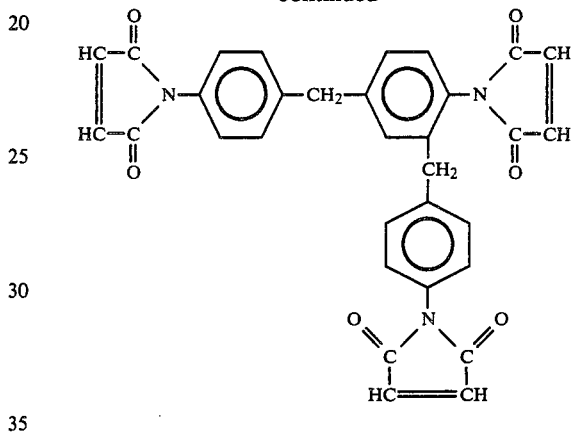

14. Powder as defined in claim 3 wherein ingredient (d) is selected from the group consisting of fumaric acid, itaconic acid and maleic acid.

15. Powder as defined in claim 1 wherein there are approximately 1.1 epoxy equivalents per acid equivalent.

16. An article coated with a composition of claim 1.

17. Product according to claim 16 in which the article is an electrically conducting wire.

18. Powder useful for applying electrically insulating coatings comprising a blend of
 (a) epoxy-terminated adduct of a hydantoin diepoxide and aromatic dicarboxylic acid imide dissolved in hydantoin diepoxide to provide a solution having a melting point between 70° and 130° C.,
 (b) acid-terminated polyester of aromatic dicarboxylic acid and diphenol containing one aromatic ring pendant from a methylene bridge, which polyester has a number average molecular weight from 2000 to 4000,
 (c) ethylenically unsaturated aromatic fluxing agent, and
 (d) an unsaturated short-chain dicarboxylic acid, said blend including from 0.9 to 1.4 epoxy equivalents of solution (a) per acid equivalent of ingredients (b) plus (d), and from 1.0 to 1.6 unsaturated equivalents of ingredient (c) per unsaturated equivalent of ingredient (d).

19. Powder as defined in claim 18 wherein the weight ratio in solution (a) of adduct to unreacted diepoxide is from 2:1 to 3:1.

20. Powder as defined in claim 18 wherein said aromatic dicarboxylic acid imide is a eutectic mixture of 21. Powder as defined in claim 20 wherein said blend includes from 1.0 to 1.3 epoxy equivalents of solution (a) per acid equivalent of ingredients (b) plus (d).

22. Powder as defined in claim 21 wherein the adduct of solution (a) is a mixture of

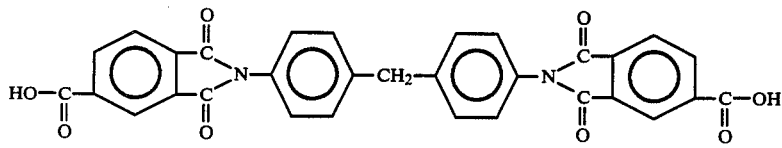

and

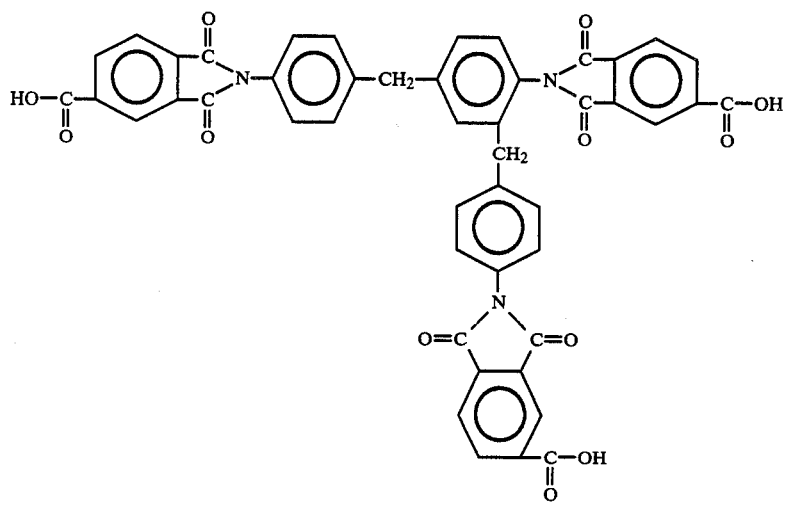

and

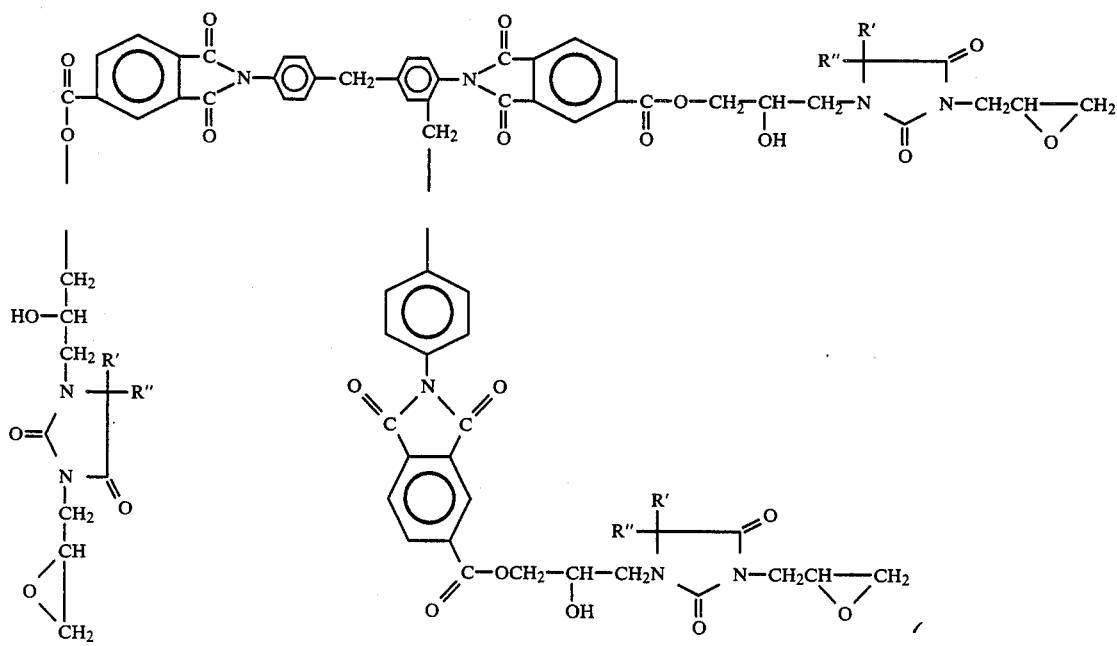

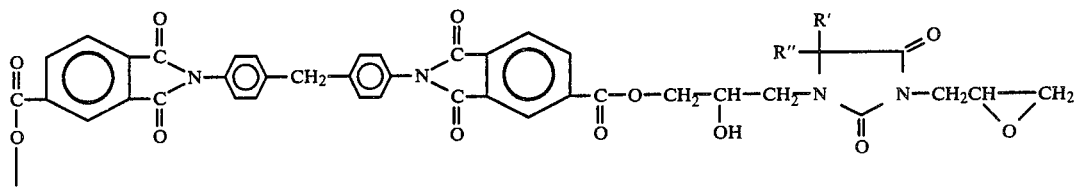

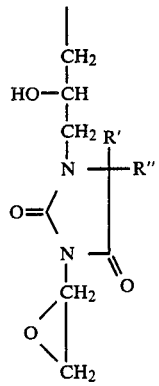

23. Powder as defined in claim 18 wherein said diphenol has the formula

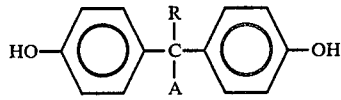

wherein R is a lower alkyl group and A is a phenyl group.

24. Powder as defined in claim 23 wherein R is methyl and A is unsubstituted.

25. Powder as defined in claim 18 wherein the fluxing agent is a bismaleimide.

26. Powder as defined in claim 25 wherein the bismaleimide is trifunctional.

27. Powder as defined in claim 26 including approximately 1.2 unsaturated equivalents of the fluxing agent (c) per unsaturated equivalent of the short-chain dicarboxylic acid (d).

28. Powder as defined in claim 27 wherein the fluxing agent has the formula

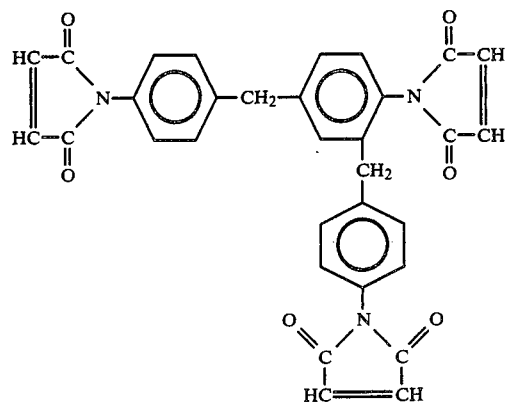

29. Powder as defined in claim 18 wherein ingredient (d) is selected from the group consisting of fumaric acid, itaconic acid and maleic acid.

30. Powder as defined in claim 18 wherein there are approximately 1.1 epoxy equivalents per acid equivalent.

31. An adduct which is a mixture of two oligomeric forms, one having the formula

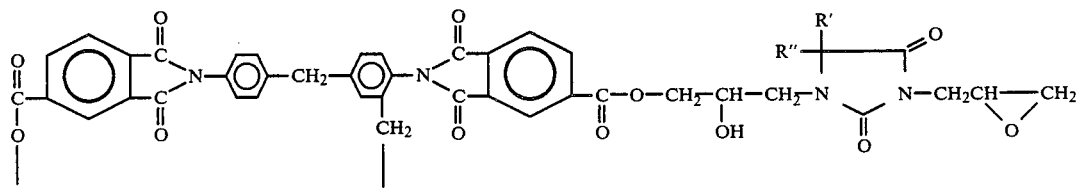

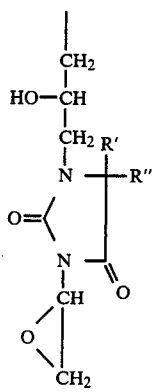 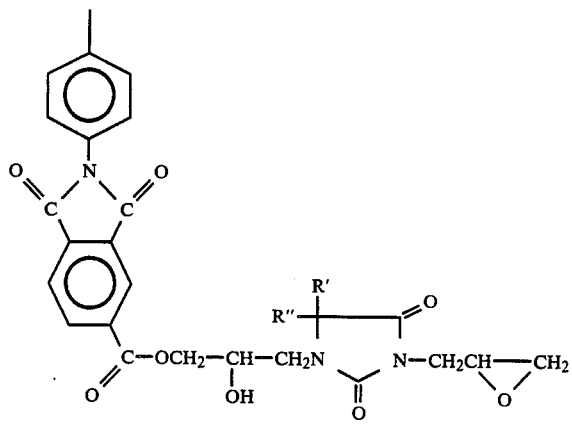
and the other having
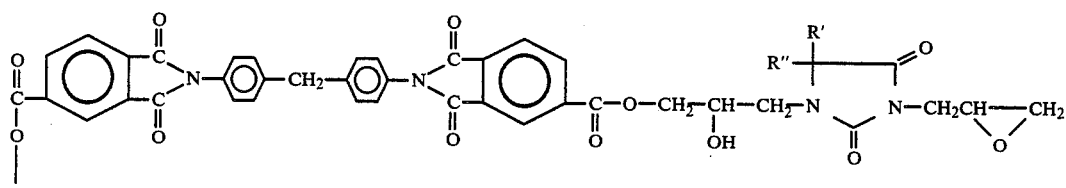
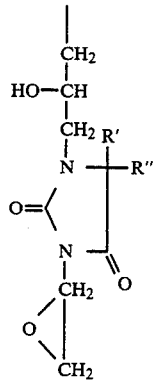
* * * * *